United States Patent
Li et al.

(10) Patent No.: US 9,874,909 B2
(45) Date of Patent: Jan. 23, 2018

(54) LAPTOP

(71) Applicant: Lenovo (Beijing) Co., Ltd., Beijing (CN)

(72) Inventors: Fenglang Li, Beijing (CN); Xiangying Zhang, Beijing (CN); Boyu Cui, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 188 days.

(21) Appl. No.: 14/670,941

(22) Filed: Mar. 27, 2015

(65) Prior Publication Data

US 2016/0147256 A1    May 26, 2016

(30) Foreign Application Priority Data

Nov. 24, 2014  (CN) .......................... 2014 2 0711584

(51) Int. Cl.
*G06F 1/16*    (2006.01)
*G06F 3/0354*    (2013.01)
*G06K 9/00*    (2006.01)

(52) U.S. Cl.
CPC .......... *G06F 1/169* (2013.01); *G06F 3/03547* (2013.01); *G06F 2203/0338* (2013.01); *G06K 9/00026* (2013.01)

(58) Field of Classification Search
CPC .............................. G06F 1/169; G06K 9/0002
See application file for complete search history.

(56) References Cited

U.S. PATENT DOCUMENTS

| | | | | |
|---|---|---|---|---|
| 2008/0025581 A1* | 1/2008 | Chen | .................... | G06K 9/0002 382/124 |
| 2009/0302722 A1* | 12/2009 | Mihara | ................. | G06F 1/1616 312/223.2 |
| 2011/0102569 A1* | 5/2011 | Erhart | ................ | G06K 9/00053 348/77 |
| 2014/0270414 A1* | 9/2014 | Slaby | ................. | G06K 9/00013 382/124 |

* cited by examiner

*Primary Examiner* — Sahlu Okebato
(74) *Attorney, Agent, or Firm* — Harness, Dickey & Pierce, P.L.C.

(57) ABSTRACT

A laptop includes a housing, a touch sensor, a fingerprint sensor and a contact panel. The housing has a through hole. The touch sensor is received in the housing and the touch sensor includes a touch area exposed through the through hole. The fingerprint sensor is received in the housing and the fingerprint sensor includes a fingerprint collecting area exposed through the through hole. The contact panel is arranged at the through hole and covers the touch area and the fingerprint collecting area.

6 Claims, 6 Drawing Sheets

LAPTOP

This application claims priority to Chinese Patent Application No. 201420711584.9, entitled "LAPTOP", filed with the Chinese Patent Office on Nov. 24, 2014, which is incorporated by reference in its entirety herein.

FIELD

This application relates to the technical field of electronic devices, and in particular to a laptop.

BACKGROUND

At present, laptops have been widely used in many people's work and life as common portable office devices. Many business people also store important files and data in their laptops, however, once a notebook is lost, especially when the notebook is obtained by a competitor, the consequences will be disastrous. Currently, a laptop usually involves a fingerprint recognition system, therefore the laptop can be turned on only by a user who is determined to be qualified through the fingerprint recognition system. The fingerprint recognition system of the laptop includes a fingerprint collecting area; the fingerprint recognition system of the laptop can automatically collect and recognize a fingerprint of the user through the fingerprint collecting area when the user puts a finger on the fingerprint collecting area.

The above fingerprint collecting area is generally an area arranged separately on an external surface of the housing of the laptop, resulting in a discontinuous appearance without uniformity of the whole laptop.

SUMMARY

A laptop is provided according to an embodiment of the present application, which includes: a housing having a through hole; a touch sensor received in the housing and the touch sensor including a touch area exposed through the through hole; a fingerprint sensor received in the housing and the fingerprint sensor including a fingerprint collecting area exposed through the through hole; and a contact panel arranged at the through hole and covering the touch area and the fingerprint collecting area.

DETAILED DESCRIPTION OF THE EMBODIMENTS

For further explaining the technical solutions adopted to attain the objects of preset application and effects of the present application, the specific embodiments, structures, features, and effects thereof are described in detail hereinafter in conjunction with the drawings, and preferred embodiments. In the following description, various "one embodiment" or "embodiments" do not necessarily refer to the same embodiment(s). Furthermore, the specific features, structures or characteristics in one or more embodiments may be combined in any appropriate form.

Figure 1:
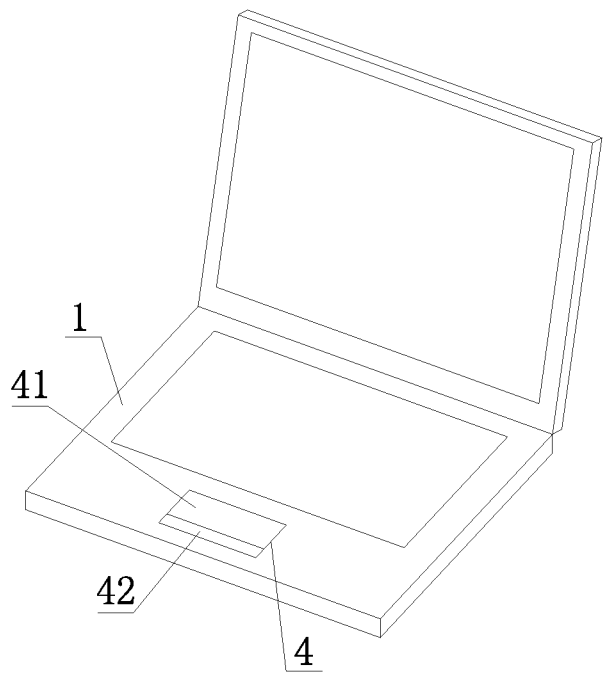
FIG. 1 is a schematic view showing the structure of a laptop according to an embodiment of the present application.
Figure 2:
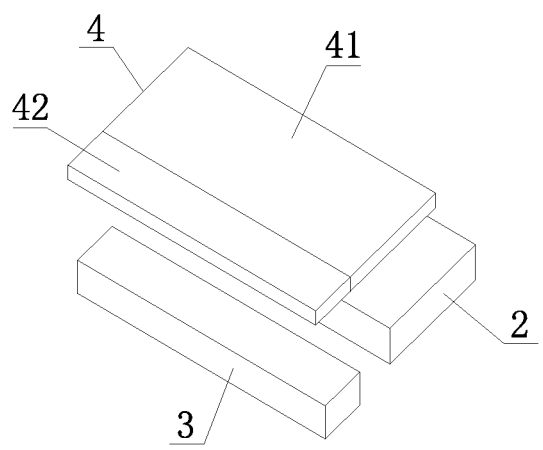
FIG. 2 is an exploded view showing the relative positional relationship between a contact panel, a touch sensor and a fingerprint sensor of a laptop according to an embodiment of the present application.

As shown in FIGS. 1 and 2, a laptop according to an embodiment of the present application includes a housing 1, a touch sensor 2, a fingerprint sensor 3 and a contact panel 4.

The housing 1 has a through hole (not indicated in the figures). The touch sensor 2 is received in the housing, and a touch area of the touch sensor 2 is exposed through the through hole. The fingerprint sensor 3 is received in the housing, and a fingerprint collecting area of the fingerprint sensor 3 is exposed through the through hole. The contact panel 4 is arranged at the through hole and covers the touch area and the fingerprint collecting area. The touch area corresponds to a first area 41 of the contact panel 4 and the fingerprint collecting area corresponds to a second area 42 of the contact panel 4. The first area 41 of the contact panel 4 serves as a touch input area; and the second area 42 of the contact panel 4 serves as a fingerprint input area.

In a specific implementation, when a user operates on the first area 41 of the contact panel 4, the touch sensor 2 is activated, and the user may then input an operation instruction to the laptop through the first area 41. When the user operates on the second area 42 of the contact panel 4, the fingerprint sensor 3 is activated, and the user may input a fingerprint to the laptop through the second area 42.

According to the technical solutions in the embodiment of the present application, the contact panel 4 is provided such that the contact panel 4 covers the touch area of the touch sensor 2 and the fingerprint collecting area of the fingerprint sensor 3, and the first area 41 of the contact panel 4 corresponds to the touch area and serves as the touch input area, the second area 42 of the contact panel 4 corresponds to the fingerprint collecting area and serves as the fingerprint input area, and thereby the contact panel 4 performs dual functions of inputting a touch and inputting a fingerprint. It is not necessary to provide a separate fingerprint input area in the laptop according to the embodiment of the present application, such that the appearance of the laptop according to the embodiment of the present application becomes continuous and uniform, and the user experience becomes better.

Figure 3:
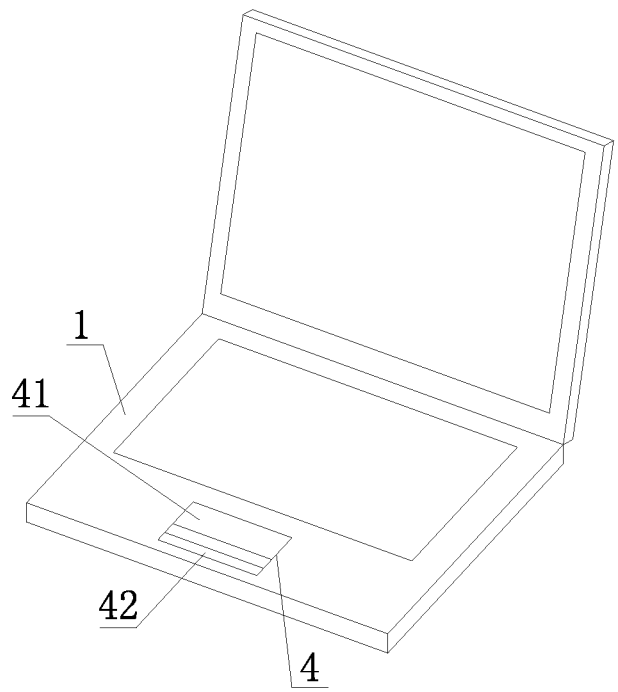
FIG. 3 is a schematic view showing the structure of another laptop according to an embodiment of the present application.

In a specific implementation, as shown in FIG. 1, at least one edge of the first area 41 and one edge of the second area 42 are coincident with each other. The first area 41 and the second area 42 may be coincident partly, or the first area 41 and the second area 42 may be coincident completely as well. The area in which the first area 41 and the second area 42 are coincident with each other has both a touch input function and a fingerprint input function. In contrast to a case that the first area 41 and the second area 42 are separated completely, the space of the contact panel 4 in this embodiment is fully utilized, also the appearance of the laptop according to this embodiment of the present application becomes uniform. In an alternative embodiment, as shown in FIG. 3, the first area 41 and the second area 42 may also be separated completely such that there is no coincidence between them.

In the above embodiment, the first area 41 and the second area 42 may have various positional relationships. For example, the second area 42 may be located at one side of the first area 41, or the second area 42 may be surrounded by the first area 41, and so on. The positional relationship between the first area 41 and the second area 42 is not particularly limited in the embodiment of the present application, as long as the first area 41 is a touch input area, and the second area 42 is a fingerprint input area. For example, several specific embodiments are provided below.

First, an embodiment that the second area 42 is located at one side of the first area 41 is shown in FIG. 1. As shown in FIG. 1, the second area 42 is located at one side of the first area 41. In a specific implementation, the touch input area is located at an upper end position of the contact panel 4, and the fingerprint input area is located at a lower end position of the contact panel 4, which would confirm with the usage habit of the user in a case that the user normally operates the laptop of this embodiment.

Figure 4:
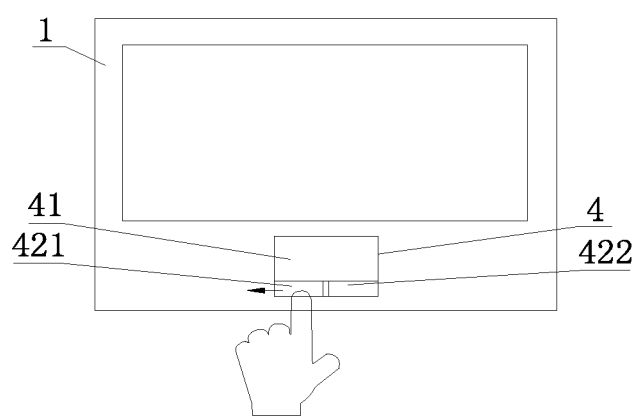
FIG. 4 is a schematic view showing the structure of a part of another laptop including a contact panel according to an embodiment of the present application.
Figure 5:
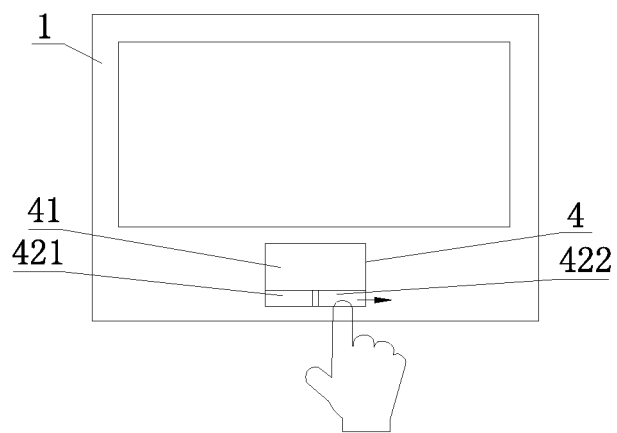
FIG. 5 is a schematic view showing the structure of a part of another laptop including a contact panel according to an embodiment of the present application.
Figure 6:
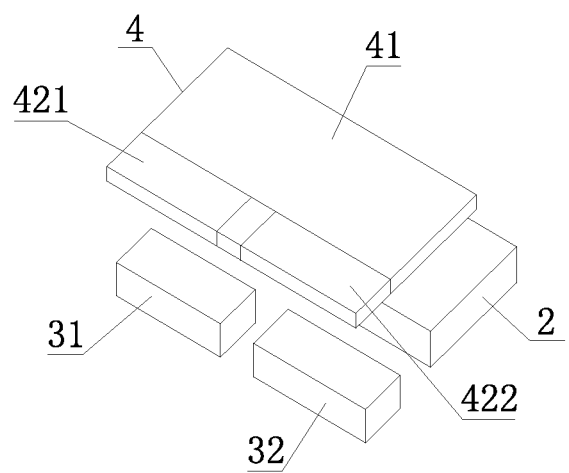
FIG. 6 is an exploded view showing the relative positional relationship between a contact panel, a touch sensor and a fingerprint sensor of another laptop according to an embodiment of the present application.

Further, as shown in FIGS. 4 and 5, the second area 42 includes a first sub-area 421 and a second sub-area 422. The first sub-area 421 and the second sub-area 422 may have the following kinds of fingerprint input methods: (1) as shown in FIG. 4, the first sub-area 421 is a slide fingerprint input area; (2) as shown in FIG. 5, the second sub-area 422 is a slide fingerprint input area; and (3) as shown in FIG. 6, both the first sub-area 421 and the second sub-area 422 are slide fingerprint input areas.

A case that both the first sub-area 421 and the second sub-area 422 are slide fingerprint input areas is taken as an example. As shown in FIG. 6, the fingerprint sensor 3 includes a first semiconductor sliding-type fingerprint sensor 31 and a second semiconductor sliding-type fingerprint sensor 32. The first sub-area 421 and the second sub-area 422 are both light-transmitting areas. The light-transmitting areas can be made of materials having a light-transmitting effect such as transparent glass or sapphire. The first semiconductor sliding-type fingerprint sensor 31 is arranged below the first sub-area 421 and coupled to the first sub-area 421 of the contact panel 4. The first semiconductor sliding-type fingerprint sensor is configured to collect a fingerprint of a finger while the finger of the user is sliding in the first sub-area 421. The second semiconductor sliding-type fingerprint sensor 32 is arranged below the second sub-area 422 and coupled to the second sub-area 422 of the contact panel 4. The second semiconductor sliding-type fingerprint sensor is configured to collect a fingerprint of a finger while the finger of the user is sliding in the second sub-area 422.

As described above, in other two embodiments, as shown in FIGS. 4 and 5, the first sub-area 421 or the second sub-area 422 is a slide fingerprint input area, and a semiconductor sliding-type fingerprint sensor may be arranged below the corresponding sub-area. The connection manner in which the semiconductor sliding-type fingerprint sensor is connected to the respective sub-area is as previously described, which will not be repeated here.

It is to be supplemented here that, the semiconductor sliding-type fingerprint sensor may also be referred to as a semiconductor scratching-type fingerprint sensor or a semiconductor temperature-sensitive fingerprint sensor, which can obtain a fingerprint image through sensing different temperatures of a ridge pressed on the laptop and a valley away from the laptop. The imaging method of the semiconductor sliding-type fingerprint sensor may include: acquiring multiple images when a finger scratches over the fingerprint sensor, and then stitching the acquired images, and finally forming the fingerprint image of the whole finger. Therefore, the scratching-type fingerprint sensor may acquire the fingerprint image of a larger area of the finger. In the embodiment, the structures of the first semiconductor sliding-type fingerprint sensor 31 and the second semiconductor sliding-type fingerprint sensor 32 are both common techniques, and can be selected as needed, which will not be repeated here.

Figure 7:
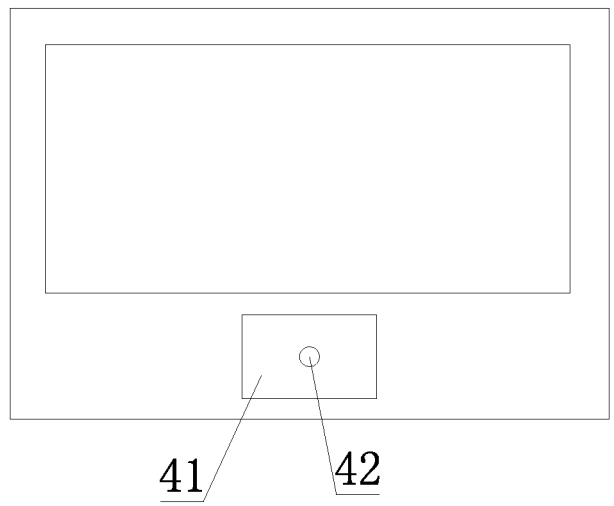
FIG. 7 is a schematic view showing the structure of a part of another laptop including a contact panel according to an embodiment of the present application.
Figure 8:
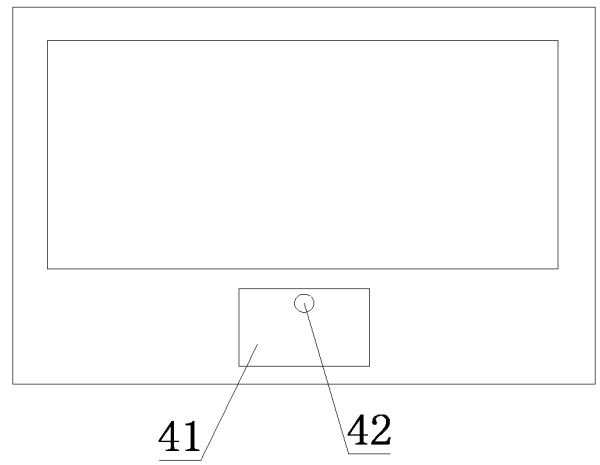
FIG. 8 is a schematic view showing the structure of a part of another laptop including a contact panel according to an embodiment of the present application.
Figure 9:
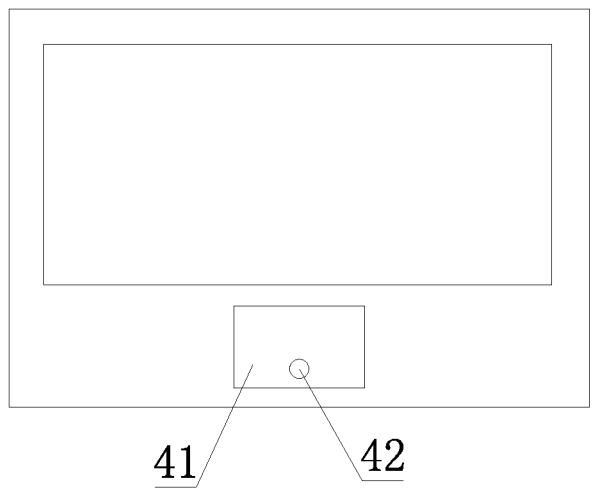
FIG. 9 is a schematic view showing the structure of a part of another laptop including a contact panel according to an embodiment of the present application.

Second, an embodiment that the second area 42 is surrounded by the first area 41 is shown in FIGS. 7 to 9. As shown in FIGS. 7 to 9, the second area 42 is surrounded by the first area 41, and the second area 42 is a press fingerprint input area. The fingerprint sensor 3 may acquire fingerprint information of a finger of a user while the user has the finger pressing on the second area 42.

Figure 10:
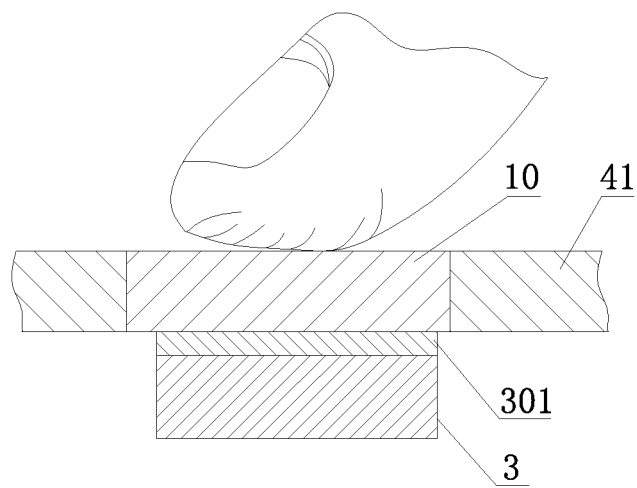
FIG. 10 is a schematic view showing the structure of a contact panel being pressed by a finger according to an embodiment of the present application.

Further, as shown in FIG. 10, the contact panel 4 is provided with a button 10 in the second area 42. The fingerprint sensor 3 is arranged below the button 10. The fingerprint sensor 3 includes a group of capacitive elements 301 capable of coupling to a fingerprint of a user in a capacitive manner. The capacitive elements 301 are coupled to the button 10. In a specific implementation, the group of capacitive elements 301 includes one or more capacitor plates arranged in a two-dimensional (2D) array, and each of the capacitor plates is placed to collect at least certain finger image information in response to ridges and valleys of the finger of the user at one or more pixels in the range of the capacitor plates array. This has such effects that: in a case that each capacitor plate in the array collects one or more pixels of the fingerprint image information, these capacitor plates, as a pack, collectively receive the fingerprint image information in a two-dimensional array. For example, the fingerprint image information in the two-dimensional array can be used to determine essential features of the fingerprint of the user, and these essential features of the fingerprint of the user can be used to register the fingerprint of the user in a database for later use, or the essential features can be compared later with a registered fingerprint image information, to recognize the fingerprint of the user and the user may be authorized based on the fingerprint image information.

Further, the button 10 can be a functional button of the laptop. For example, the button may be a power button or an external information input button, which may be arranged according to practical requirements of the user.

Further, the button 10 of the above embodiment can be made of materials having a light-transmitting effect such as transparent glass or sapphire. It may be that at least a part of the upper surface of the button 10 forms a dented shape, which has an effect for guiding a finger of the user to the button 10.

In a specific implementation, the button 10 may be in a circular shape. However, in an alternative embodiment, the button 10 may also be configured as another shape, such as a rectangular or a hexagonal shape, adaptable to receive two-dimensional fingerprint image information.

Figure 11:
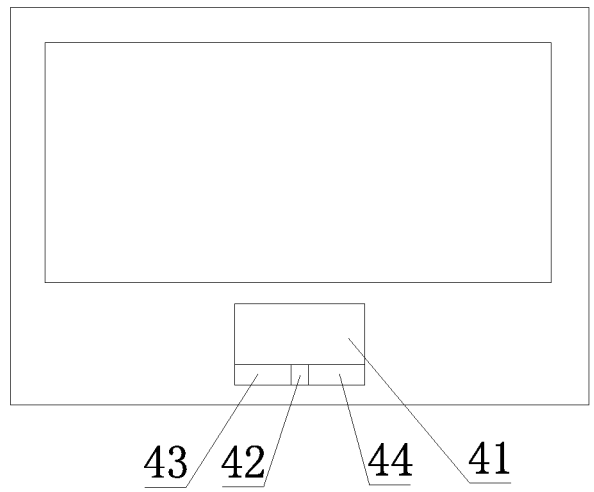
FIG. 11 is a schematic view showing the structure of a part of another laptop including a contact panel according to an embodiment of the present application.

In a specific implementation, as shown in FIG. 11, the contact panel 4 also includes a first button 43 and a second button 44. The first button 43 and the second button 44 are arranged side-by-side. The user can input external information to the laptop by means of each of the first button 43 and the second button 44. The second area 42 is arranged between the first button 43 and the second button 44. This arrangement facilitates the fully utilization of the space of the contact panel 4, such that the appearance of the laptop according to the embodiment of the present application becomes continuous and uniform, and the user experience becomes better.

Figure 12:
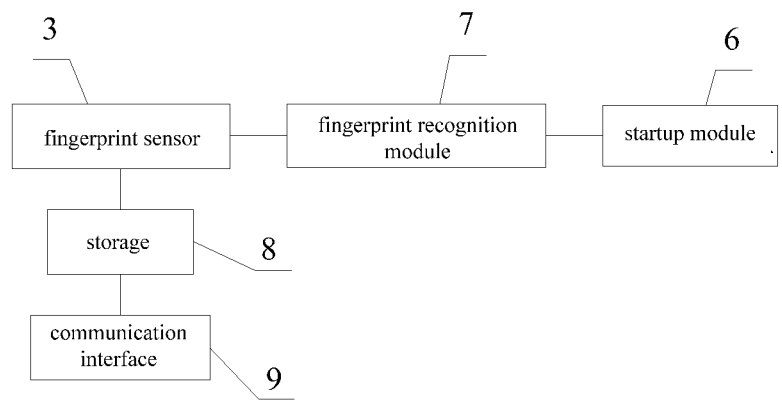
FIG. 12 is a block diagram showing partial structure of another laptop according to an embodiment of the present application.

In a specific implementation, as shown in FIG. 12, the laptop according to an embodiment of the present application further includes a startup module 6 and a fingerprint recognition module 7. The startup module 6 is configured to start the laptop upon receiving a startup instruction.

The fingerprint recognition module 7 includes an input terminal and an output terminal. The input terminal of the fingerprint recognition module 7 is connected to the fingerprint sensor 3, and the output terminal of the fingerprint recognition module 7 is connected to the startup module 6. The fingerprint recognition module 7 is configured to process first data collected by the fingerprint sensor 3 into second data and send the second data to the startup module 6. In a specific implementation, the fingerprint sensor 3 is configured to send the collected fingerprint information to the fingerprint recognition module 7, the fingerprint recognition module 7 recognizes the collected finger information, and when it is recognized that the collected finger information meets the requirement, the fingerprint recognition module 7 will send a startup instruction to the startup module 6 and the startup module 6 starts the laptop after receiving the startup instruction.

It is to be implemented here that, the specific structures of the startup module 6 and the fingerprint recognition module 7 in the embodiment are both common techniques and can be selected as needed, which are not repeated here.

Further, as shown in FIG. 12, the laptop according to an embodiment of the present application further includes a storage 8 and a communication interface 9. The storage 8 is connected to the fingerprint sensor 3 and configured to store fingerprint information collected by the fingerprint sensor 3. The communication interface 9 is connected to the storage 8 and is configured to exchange data with an external device, and the communication interface 9 may be an USB interface or the like. In a specific implementation, the fingerprint sensor 3 may store the collected fingerprint information in the storage 8, and the user may copy the fingerprint information stored in the storage 8 via the communication interface to an external device for backup or edition at anytime as needed, which can effectively prevent the data from being lost, and the operation is convenient.

According to the technical solutions in the embodiments of the present application, the contact panel 4 is provided such that the contact panel 4 covers the touch area of the touch sensor 2 and the fingerprint collecting area of the fingerprint sensor 3, and the first area 41 of the contact panel 4 corresponds to the touch area and serves as a touch input area, the second area 42 of the contact panel 4 corresponds to the fingerprint collecting area and serves as a fingerprint input area, and thereby the contact panel 4 performs dual functions of inputting a touch and inputting a fingerprint. It is not necessary to provide a separate fingerprint input area in the laptop according to the embodiments of the present application, such that the appearance of the laptop according to the embodiments of the present application becomes uniform, and the user experience becomes better.

The above descriptions are merely preferred embodiments of the present application, and are not limitations in any form to the present application, and any obvious alternations, modifications, and equivalents made to the above embodiments according to the technical essential of the present application should fall within the scope of protection of the present application.

What is claimed is:

1. A laptop, comprising:
a housing having a through hole;
a touch sensor received in the housing and the touch sensor comprising a touch area exposed through the through hole;
a press fingerprint sensor received in the housing and the press fingerprint sensor comprising a fingerprint collecting area exposed through the through hole; and
a contact panel arranged at the through hole and covering the touch area and the fingerprint collecting area, wherein the contact panel comprises a first area corresponding to the touch area and a second area corresponding to the fingerprint collecting area,
wherein the contact panel is provided with a button at the second area, and the button is made of light-transmitting materials;
the press fingerprint sensor is arranged below the button;
the press fingerprint sensor comprises an array of capacitive elements capable of coupling to a fingerprint of a user in a capacitive manner; and
the capacitive elements are coupled to the button, and receive the fingerprint of the user via the button when a finger of the user presses on the button.

2. The laptop according to claim 1, wherein
the laptop further comprises a semiconductor sliding-type fingerprint sensor received in the housing and the semiconductor sliding-type fingerprint sensor comprises a fingerprint collecting area exposed through the through hole, and the contact panel further comprises a third area corresponding to the fingerprint collecting area of the semiconductor sliding-type fingerprint sensor; and
the semiconductor sliding-type fingerprint sensor is arranged below the third area and coupled to the third area of the contact panel, and the semiconductor sliding-type fingerprint sensor is configured to be a sensor which collects a fingerprint of a finger while the finger is sliding in the third area.

3. The laptop according to claim 1, wherein:
the contact panel further comprises a first button and a second button;
the first button and the second button are arranged side-by-side, and each of the first button and the second button is configured to be a button for a user to input external information to the laptop; and
the second area is arranged between the first button and the second button.

4. The laptop according to claim 1, further comprising:
a startup module, configured to start the laptop upon receiving a startup instruction; and a fingerprint recognition module, wherein the fingerprint recognition module comprises an input terminal and an output terminal, wherein the input terminal is connected to the press fingerprint sensor, the output terminal is connected to the startup module, and the fingerprint recognition module is configured to process first data collected by the press fingerprint sensor into second data and send the second data to the startup module.

5. The laptop according to claim 1, further comprising:
a storage, connected to the press fingerprint sensor and configured to store fingerprint information collected by the press fingerprint sensor; and
a communication interface, connected to the storage and configured to exchange data with an external device.

6. The laptop according to claim 1, wherein the first area of the contact panel serves as a touch input area; and the second area of the contact panel is a fingerprint input area.

* * * * *